United States Patent [19]

Sagane et al.

[11] 4,025,257
[45] May 24, 1977

[54] APPARATUS FOR CONTINUOUSLY MANUFACTURING AN ELONGATED REINFORCED SHAPED ARTICLE

[75] Inventors: Norio Sagane, Mishima; Toru Morimoto, Takatsuki; Fumihiko Okagawa, Hirakata, all of Japan

[73] Assignee: Sekisui Kagaku Kogyo Kabushiki Kaisha, Osaka, Japan

[22] Filed: June 12, 1975

[21] Appl. No.: 586,370

Related U.S. Application Data

[62] Division of Ser. No. 361,045, May 17, 1973, Pat. No. 3,917,774.

[30] Foreign Application Priority Data

May 17, 1972 Japan .............................. 47-49279

[52] U.S. Cl. .............................. 425/115; 425/329; 425/817 C
[51] Int. Cl.$^2$ .......................................... B29D 27/04
[58] Field of Search .............. 425/4 C, 817 C, 115, 425/329, 371, 224, 505, 385, 396; 264/174, 46.2, 45.3, 54, 45.8, 46.5; 156/434

[56] References Cited

UNITED STATES PATENTS

| | | | |
|---|---|---|---|
| 842,356 | 1/1907 | Stone | 425/371 X |
| 2,187,254 | 1/1940 | Wallace | 425/329 |
| 2,817,875 | 12/1957 | Harris et al. | 425/115 |
| 3,065,500 | 11/1962 | Berner | 425/329 X |
| 3,408,690 | 11/1968 | Jacob | 425/115 X |
| 3,579,722 | 5/1971 | Schmidt et al. | 425/4 C |
| 3,657,040 | 4/1972 | Shobert | 264/174 X |
| 3,728,424 | 4/1973 | Bauer | 264/174 X |
| 3,792,141 | 2/1974 | Offut | 264/46.5 X |

Primary Examiner—Francis S. Husar
Assistant Examiner—Mark Rosenbaum
Attorney, Agent, or Firm—Armstrong, Nikaido & Marmelstein

[57] ABSTRACT

An apparatus for continuously manufacturing an elongated shaped article reinforced by a multiplicity of continuous and parallel fibers is provided. The apparatus includes a series of means for arranging a multiplicity of advancing continuous and parallel fibers into a sheet-like bundle of fibers, means for impregnating the sheet-like bundle of fibers with a liquid foamable resin, means for receiving and gathering the resin impregnated sheet-like bundle of fibers into a gathered bundle of fibers having the resin dispersed therein, a moveable molding passage of three or more endless belts facing one another in parallel relationship and having a cross-section perpendicular to the direction of movement of the fibers corresponding to the cross-section of the desired shaped article and which contact and move with the resin-impregnated bundle of fibers to form the elongated shaped article and means for extracting the elongated shaped article from the molding passage.

12 Claims, 17 Drawing Figures

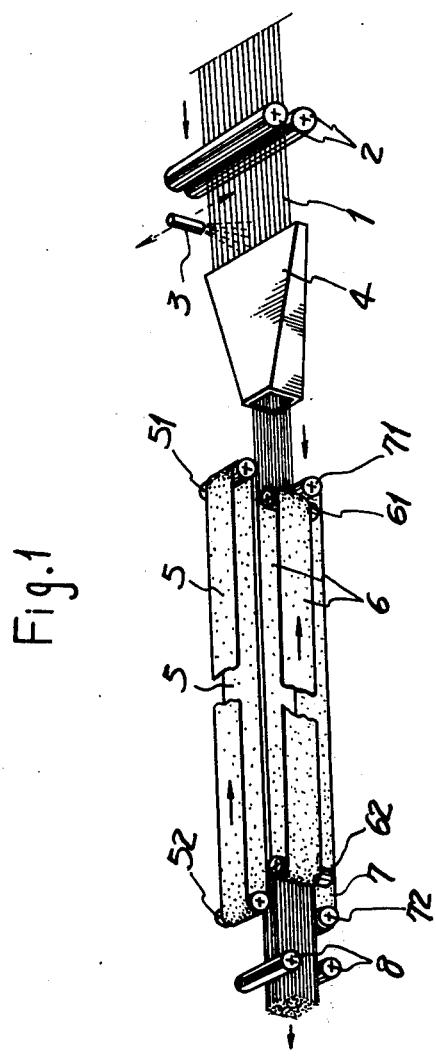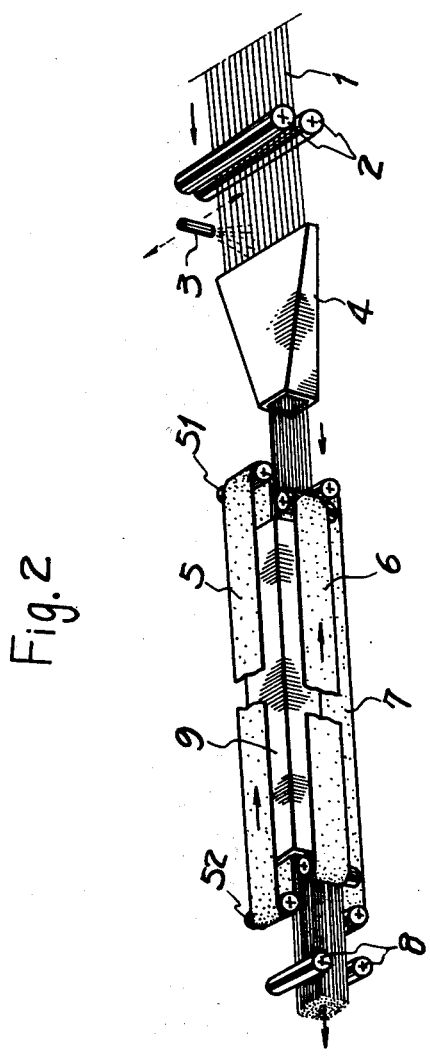

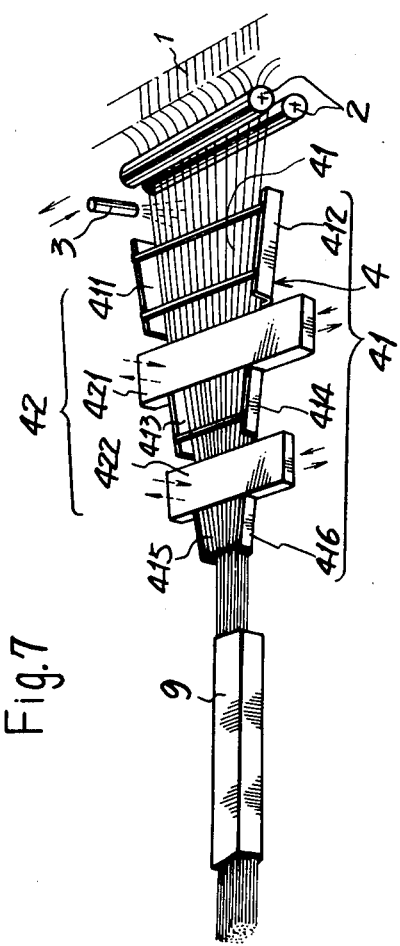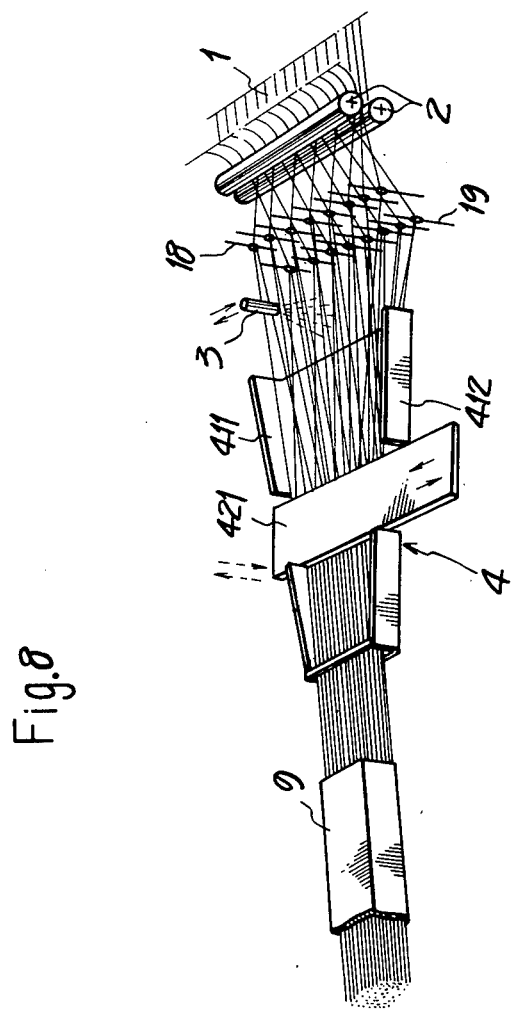

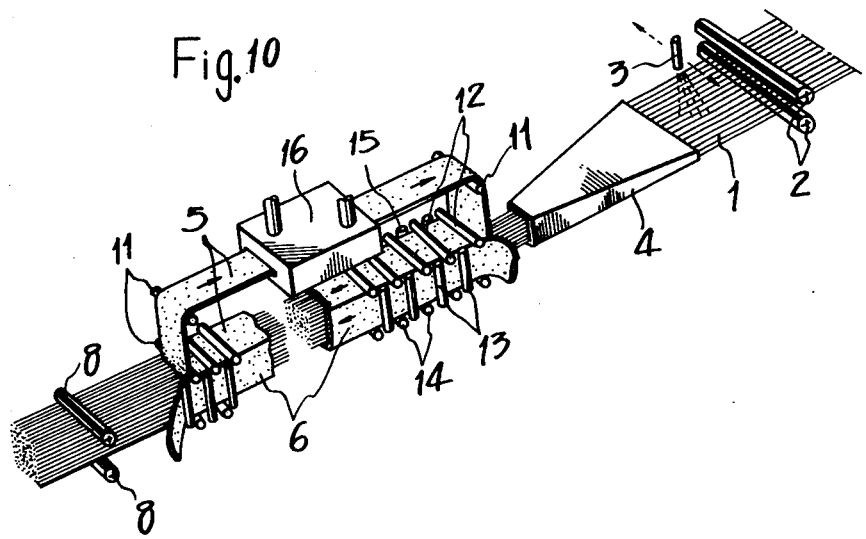
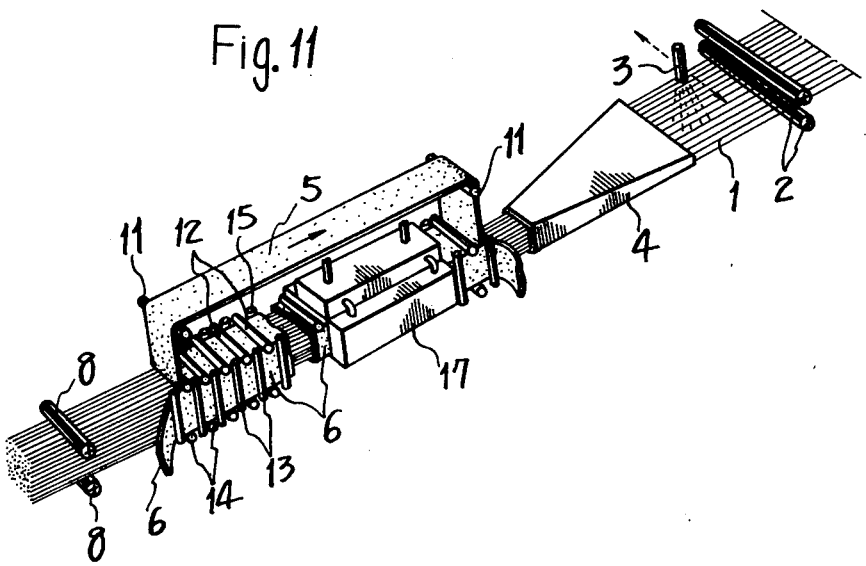

APPARATUS FOR CONTINUOUSLY MANUFACTURING AN ELONGATED REINFORCED SHAPED ARTICLE

This is a division, of application Ser. No. 361,045 filed May 17, 1973 now U.S. Pat. No. 3,917,774.

DETAILED EXPLANATION OF INVENTION

This invention relates to a continuous process and to apparatus for preparing a shaped article of a foamed resin reinforced by glass fibres. Nore particularly, this invention relates to a continuous process and to apparatus for preparing an elongated shaped article of a foamed resin reinforced by a multiplicity of continuous glass fibres, wherein a liquid substance is hardened into said resin during a comparatively short time, and wherein said fibres run in the longitudinal direction of the article and are evenly dispersed in the foamed resin.

Among synthetic resins, polyurethane resin, phenolic resin, urea resin, pyranyl resin and the like are all liquid when they are initial condensation products, and harden into said foamed resins when subjected to further condensation or polymerization in an extremely short period of time. For example, it is only in few minutes that a liquid composition for forming polyurethane completes a condensation reaction and. If there is water present during the reaction, the water acts as a forming agent and there is obtained a foamed article. When such products are used, it is not easy to obtain a foamed article having a desired shape in which a multiplicity of continuous fibres are parallel and evenly dispersed. The liquid composition will complete the condensation reaction in a few minutes, and as the reaction proceeds, it becomes impossible to change positions of the continuous fibres in the composition to uniformly disperse the fibres therein or to form the composition into a desired shape. It is necessary therefore, to disperse the liquid composition uniformly in the continuous filaments in only a few minutes, but, it is quite difficult to do so. Additionally, the liquid composition expands and increases in volume as the reaction proceeds and it is necessary in carrying out the molding operation to take into consideration the expansion in volume of the composition. This is also very difficult. Consequently, there has heretofore been no process suitable for the continuous and efficient preparation of a shaped article of a foamed resin which is reinforced by a multiplicity of continuous fibres.

The Netherlands published patent application No. 6,715,196 describes a process for preparing an elongated article which comprises arranging a multiplicity of continuous glass fibres in parallel, introducing said fibres into a trigonal damper wherein the fibres are impregnated with a liquid composition which, allowing the fibres to contact a rubber scraper to remove surplus liquid, winding the fibres around a hank reel, and thereafter drying the fibres, and unwinding the fibres to introduce them into a mold having a straight passage wherein the liquid is hardened and foamed. However, the process is by no means practical where the liquid hardens into a resin during a very short period of time such as with urethane resin. Furthermore, it is discontinuous inefficient to wind the impregnated fibres around the hank reel.

SUMMARY OF THE INVENTION

According to the invention it has been found to be efficient to advance the glass fibres in the form of a bundle and to introduce and pass them through a gathering means wherein the cross section perpendicular to the advancing direction of the fibres is gradually varied so that the glass fibres may be gradually allowed to change their mutual positions in order to evenly disperse the liquid composition into the glass fibres in the shortest possible time. Said means is, for example, has an inlet opening in the form of a slit having a large width and small height, an outlet opening in a circular or square form and, intermediate walls between both openings gradually varied so as to connect both openings by smooth surfaces. It has been found that the liquid composition can be more quickly and evenly dispersed into the glass fibres when said means is used. Before it is introduced into said means, the bundle is provided with the liquid composition which is ejected from a nozzle swinging in the direction of the bundle. The bundle is then passed through the means so as to gather the bundle into a circular or square cross section.

Initially attempts were made to introduce the liquid composition containing glass fibres immediately into the tube having a desired cross section, of the finished articles. However, when the glass fibres are introduced into the narrow passage, and the liquid composition contained in the glass fibres is foamed in the passage, the composition becomes highly viscous, and tends to adhere to inner walls thereby giving a flaw to a surface of the obtained article.

According to the invention, therefore, a passage constructed by a plurality of belt conveyers, is employed. As the result, a good shaped article can be obtained. The process of the invention comprises therefore, continuously advancing a multiplicity of continuous glass fibres in parallel relationship, providing the glass fibres with a liquid composition, introducing the glass fibres into a passage constructed by at least three conveyer belts facing one another, and transferring the glass fibres together with the conveyer belts, thereby allowing the liquid composition to harden and foam while the composition is advancing together with the conveyor belts. According to above process, a shaped article can be obtained which has smooth surfaces and a cross section corresponding to the cross section confined by the conveyor belts.

Thus, according to the present invention there is provided a process for the continuous preparation of a shaped article of a foamed resin reinforced by glass fibres which comprises advancing a multiplicity of continuous fibres in parallel relationship to each other, impregnating the fibres with foamable liquid which is at first in a liquid state and therefore hardened into a thermosetting resin in a relatively short time, advancing the fibres into a passage for molding which is constructed from at least three endless belts facing one another in parallel relationship, wherein the liquid is foamed and hardened to give a porous shaped article having a cross section corresponding to the cross section enclosed by the endless belts.

BRIEF DESCRIPTION OF THE DRAWINGS

FIG. 1 is an askance view, partly cut away, of one embodiment of the invention.

FIG. 2 is an askance view, partly cut away, of another embodiment of the invention, wherein a rectangular tube is further added to the embodiment shown in FIG. 1.

FIGS. 7 and 8 are askance views of means for impregnating evenly and quickly a multiplicity of continuous fibres with the foamable liquid.

FIGS. 10 and 11 are other embodiments, partly cut away, of the invention.

DETAILED DESCRIPTION

Figure 3:
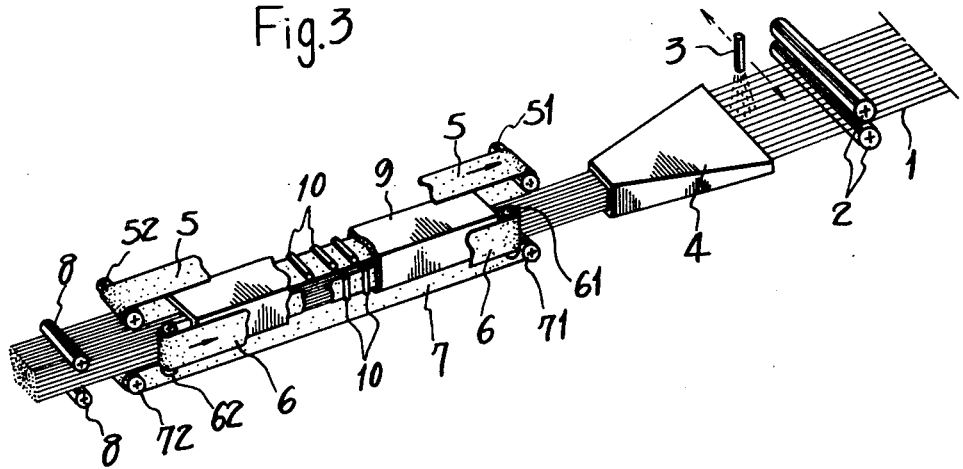
FIG. 3 is an askance view, partly cut away, of another example of the process, wherein a number of rolls are mounted on inner walls of the rectangular tube shown in FIG. 2.

In FIG. 1, a pair of rolls 2 nip several groups of continuous fibre, wherein each of the groups is spread over the entire width of the rolls, to form a bundle of the fibre 1. By rolls 2 the bundle of the fibre 1 is allowed to advance as if it were a belt of considerable width. Nozzle 3 is for supplying the bundle of the fibre with the foamable liquid and is provided above the bundle of the fibre 1. Nozzle 3 can recriprocate in the width direction of the bundle of the fibre as shown by the dotted line in FIG. 1, and thus the foamable liquid is evenly applied on the bundle of the fibre especially in the width direction of the bundle. The bundle of the fibre is thus allowed to contain or is impregnated with, the foamable liquid, and is then introduced into gathering means 4.

Gathering means 4 is constructed from, for example, a tube having a slit of considerable width and of small height at the inlet side of the bundle and having an almost square opening at the outlet side. In the middle portions from the inlet to the outlet of gathering means 4, walls are constructed so that the cross section may be gradually changed from the slit to the square opening, and such that the cross section is of such an area that the bundle of the fibre containing the foamable liquid can pass through gathering means 4 without leaving considerable space. As the result, each fibre is gradually changed in its relative position in the bundle during the course of passing through gathering means 4, thereby dispersing the foamable liquid uniformly in the bundle of the fibre.

Thereafter the bundle of the fibre is introduced into a passage for molding, which is formed by arranging endless belts 5 to 7 so as to surround the bundle. The bundle is allowed to advance along with endless belts 5 to 7. In the passage for molding, foaming as well as hardening of the foamable liquid occur, and the liquid together with the bundle of the fibre are changed into a shaped article having a cross section just equal to the cross section enclosed by the endless belts. The shaped article is pulled out by rolls 8 and there can be obtained an elongated article.

According to above process, the foamable liquid is transferred while contained in the bundle of the fibre, allowed to foam up to contact the surfaces of the endless belts, and allowed to complete hardening in contact with the endless belts which advance along with the bundle of the fibre. There is therefore, no friction between the foamed resin and the endless belts; consequently there can be easily obtained an article having a beautiful surface and shape just equal to the shape of the passage.

In the process of the invention there is used a multiplicity of continuous fibres. The fibres may be strands which are prepared by entangling a multiplicity of short fibres, or may be monofilaments. In general, all fibres that have an appearance of continuous fibres can be used as the continuous fibres. The fibres may be glass fibres, natural fibres, or synthetic fibres. The synthetic fibres may be, for example, polyamide, polyester, or polyolefin fibres. The natural fibres may be, for example, rayon. Most preferably the fibres are made of glass in order to reinforce the foamed resin in the shaped article.

The fibres are impregnated with a foamable liquid. The foamable liquid contains a liquid which can be hardened into a resin by chemical reaction such as, for example, an unsaturated prepolymer for use in forming polyester resin, or a mixture of polyisocyanate and polyalcohol for forming polyurethane resin. Among the liquids it is polyurethane resin that produces the most useful effect. The reason is due to the fact that polyurethane resin is formed from the mixture of polyisocyanate and polyalcohol in an extremely short time. In addition to polyurethane resin, initial condensation product of phenolic resin, or that of urea resin may be used for the liquid, and further pyranyl resin may be used. These are changed the respective resins in an extremely short time under suitable conditions. These resins may be used alone or together. The mixture of isocyanate and polyalcohol has foaming property when a small amount of water is added thereto; therefore no further foaming agent is required in this case. However, foaming agent is required in cases wherein the other compositions are used. Suitable foaming agent may be selected from known foaming agents according to properties of the composition used.

In the invented process it is required that the foamable liquid be contained in the bundle of the fibre. In order to meet the requirement, it is preferable to maintain the bundle in a wide range in the width direction so that the liquid may penetrate between each of the fibres and also may be evenly dispersed into the bundle. It is in order to meet the above requirement that in FIG. 1, fibres 1 are dispersed in a wide range in the position of rolls 2. While the fibres are so dispersed, nozzle 3 goes and returns in the directions shown by dotted lines in FIG. 1, and the foamable liquid is emitted from nozzle 3, thus the foamable liquid becomes dispersed in the bundle of the fibre. The bundle of the fibre is then gathered into a comparatively narrow range by means of, for example, gathering means 4. Thus, the foamable liquid can be evenly and quickly dispersed in the bundle of the fibre. Then the bundle of the fibre is introduced into a passage for molding and allowed to pass therethrough.

The passage for molding is constructed by arranging at least three endless belts so that the endless belts are located in parallel and opposite relationship to form a polygonal shaped passage. In the example shown in FIG. 1, a passage for molding is constructed by four endless belts which are positioned to form a rectangular tunnel. Each of the endless belts is supported by rolls. For example, endless belt 5 in FIG. 1 is supported by guide rolls 51 and 52, and can rotate with rotation of these rolls. Likewise, endless belt 6 is also rotatably supported by rolls 61 and 62. If necessary, similar rolls may be further provided between these guide rolls.

Figure 13A:
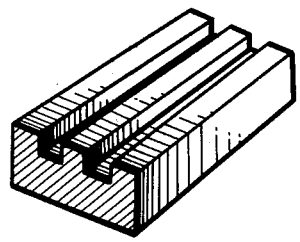
FIG. 13 (b) is an askance view of an endless belt, partly cut away, used in the invention, and FIG. 13 (a) is an askance view of a portion of an obtained article when the endless belt as shown in FIG. 13 (b) is used.
Figure 13B:
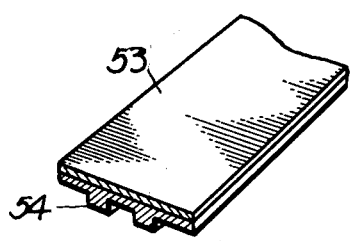

It is necessary in constructing the endless belt to use material which is not attacked by the foamable liquid, and preferably to use material having high rigidity, especially metallic material. The material may be, in general, steel, preferably stainless steel, silicone rubber reinforced by fibres, or synthetic or natural rubber which is reinforced by fibres and covered with baked silicone rubber. Among these, stainless steel is most preferable. Additionally, the endless belt may be made of two materials, that is a piled endless belt. In the piled endless belt, two belts may be adhered each other, or may be piled without being adhered each other. An example of the piled endless belt is shown in FIG. 13 (b), wherein an endless belt 53 made of stainless steel is piled together with an endless belt 54 made of rubber reinforced by fibres and provided with projecting portions. The piled endless belt is suited for preparing an elongated member having two grooves, such as a lintel which is shown in FIG. 13 (a).

Preferably the period of time for which the foamable liquid is advanced in contact with the endless belt commences from the time when said liquid begins to be foamed and becomes a white creamy state, and ends when said liquid has completed the foaming. In general, the foamable liquid used herein changes from a liquid state into hardened resin in an extremely short time. The time is classified into the following five times; mixing time of the raw materials, cream time, tack free time, rise time, and set time. By the cream time is meant the duration which starts from the time when the foamable liquid begins to foam in a creamy state and ends immediately before the liquid begins to foam to a visible degree. Preferably it is the moment when the liquid has reached the cream time that the foamable liquid enters the passage for molding. By the tack free time is meant the duration from the end of the cream time until the foamable liquid shows no tackiness on the surface portion thereof, that is, the duration until the foamable liquid does not stick to a finger. By the rise time is meant the duration from the moment when the creamy liquid begins to expand to the moment when the liquid reaches a maximum value of expansion. By the set time is meant the duration from the moment when said rise time has ended to the moment when the liquid has completed hardening. According to the above times, it may be after or prior to the set time so long as it is after the rise time, that the liquid impregnated fibres are discharged from the passage for molding.

Length of the passage for molding is determined so that the foamable liquid may be in the passage during the time required for foaming and hardening of the liquid. Therefore, the length of the passage varies depending upon both the hardening rate of the liquid and the advancing velocity of the fibres. When the liquid is of a high hardening velocity, the length of the passage may be shortened, and when the fibres advance at low velocity, the length of the passage may also be shortened.

It is required that inner dimensions at the outlet side of the passage, which are determined by the endless belts, correspond to the dimension of a desired article. However, it is not necessary at the inlet side of the passage. The passage will normally have an identical cross section from the inlet side to the outlet side; however, it is not always the case. There may be some difference between cross sections of the inlet end and of the outlet end in the passage. This is because the foamable liquid expands and is hardened in the course of advancing with the passage for molding, and the difference is not an obstacle when the liquid is not yet completely hardened.

It is preferable that the passage has at its outlet side an opening, the area of which is within a range from one-fifth to four-fifths of a cross sectional area occupied by said liquid impregnated fibres when they are exposed to free expansion. When said opening is of an area greater than four-fifths the fibres do not come to be evenly dispersed and consequently form an uneven article additionally the liquid does not fulfill the opening to every corner, and as a result an article having a desired shape cannot be normally obtained. Even if an article having a desired shape in appearance can be obtained, the article often has big cavities in its inner portions. Conversely, when the opening is of an area less than said one-fifth, it becomes difficult to advance the liquid impregnated fibres in the passage for molding. Even if the fibres can be advanced in the passage, a portion of the foamable liquid is allowed to flow backward to the inlet side because of the foaming pressure, and it becomes difficult to carry out continuous operation. In any event, it is preferable that the passage have at its outlet end an area within said range.

Since the endless belts are rotated by the advancing and contacting fibres, it is not required to rotate the endless belts forcibly by a motor. For example, referring to FIG. 1, endless belt 5 is supported in an flat state by guide rolls 51 and 52, which are located at both ends of the endless belt 5. In this case, endless belt 5 may be smoothly rotated by pulling a foamed article by means of a pair of rolls 8.

According to the above process, the liquid impregnated fibers can be maintained in a desired shape, because they are advanced in contact with the endless belts throughout the duration from the time when the fibers are impregnated with the liquid to the time when the liquid has ended the rise time. During this time the surfaces of the liquid impregnated fibers are not scaped by the endless belts; therefore the obtained product has beautiful surfaces. It is also possible to obtain a product having a desired pattern by using an endless belt which has a corresponding engraved pattern.

In the process shown in FIG. 2, there is added rectangular tube 9 to the process shown in FIG. 1. Therefore, a passage for molding is constructed by a combinations of endless belts 5, 6, 7 etc. and rectangular tube 9. In FIG. 2, the endless belt oppsite to endless belt 6 cannot be seen and accordingly is not shown. The endless belts 5, 6, 7 etc. are arranged so as to advance along respective inner surfaces of rectangular tube 9. The passage for molding shown in FIG. 2 has an advantage that endless belts 5, 6 and 7 etc, are not outwardly moved, even when the foamable liquid expands and exerts high pressure against the endless belts. Therefore, the process shown in FIG. 2 is more suited to obtain an article having a desired shape when the foamable liquid is of a high expansion rate and of a high expansion pressure.

Almost all explanations which has been made with reference to the process shown in FIG. 1 can be applied to the process shown in FIG. 2, except that the passage for molding is constructed by rectangular tube 9 and endless belts 5 to 7. That is, the continuous fibres, foamable liquid, impregnating process, endless belts are all substantially identical in both processes. Therefore, only the passage for molding will be explained hereunder with reference to the process shown in FIG. 2.

As already stated, the passage for molding shown in FIG. 2 is constructed by rectangular tube 9 and endless belts 5 to 7. Rectangular tube 9 is fixed in a certain place, and endless belts 5 to 7 are arranged so as to be able to rotate along inner surfaces of rectangular tube 9. In this case, it is preferable to provide each of the inner surfaces of rectangular tube 9 with an endless belt, however, it is not always required. The endless belt may be provided only on a surface corresponding to a surface of the obtained article of which surface is required to be especially smooth.

Rectangular tube 9 should be made from the material which can resist against foaming pressure of the foamable liquid. Preferably the material is metal. It goes without saying that a shape of rectangular tube 9 should be changed according to a shape of a desired article. For example, if a desired article is of trigonal cross section, tube 9 should be made to a trigonal tube. It should be noted that the shape of the tube is not always corresponding to the shape of a desired article in the strict meaning of the words, as in the case wherein a piled endless belt as shown in FIG. 13 (b) is used together with a rectangular tube in order to obtain an article as shown in FIG. 13 (a).

In carrying out the process shown in FIG. 2, there may arise a problem as to friction between endless belts 5, 6, 7 etc. and rectangular tube 9. The problem can be solved to some degree by selecting suitable materials for the endless belts and for the rectangular tube, for example, by using steel both for the endless belts and for the rectangular tube. In the event that the problem is not yet solved, suitable lubricant may be further applied to the contacting surface of the endless belts with the rectangular tube. In general, lubricants used in bearings can be preferably employed in this case.

According to the process shown in FIG. 2, the endless belts are maintained so that they may construct a desired cross section even in the event that the endless belts are made of some resilient material and are of considerable length, because the endless belts are advanced along the inner surfaces of the rectangular tube. Even if the foamable liquid exerts a considerable pressing force against the endless belts, the endless belts are prevented from bending outwardly. Therefore, as already stated, the process is suited for obtaining an article having a desired cross section when high pressing force is exerted by the foamable liquid and when the passage for molding is required to be of an extended length.

In the process shown in FIG. 3, rolls 10 are added to inner surfaces of rectangular tube 9. In this case, a passage for molding is constructed by a combination of rectangular tube 9, rolls 10 mounted on the inner surfaces of rectangular tube 9, and endless belts 5, 6, 7 etc. advancing along said inner surfaces in contact with rolls 10. Thus, endless belts 5, 6, 7 etc. are advanced along the inner walls of rectangular tube 9 by rolling friction of rolls 10. Therefore, it is easy to advance the endless belts. Consequently the process shown in FIG. 3 can be more easily carried out than the process shown in FIG. 2, even when the foamable liquid exerts high pressing force against the endless belts and the endless belts are of considerable length.

Figure 14:
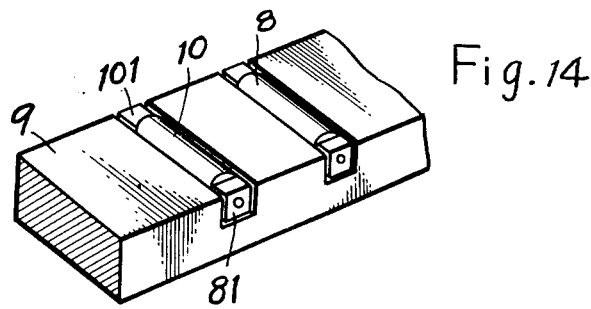
FIG. 14 ias an askance view of an inner wall of the rectangular tube used in the process and apparatus shown in FIG. 3 and partly cut away, and shows the manner of mounting rotating rolls on the inner surface of the tube.

In the process shown in FIG. 3, rolls 10 are mounted on the inner surfaces of rectangular tube 9. It is preferable that said rolls 10 are mounted on the inner surfaces, for example, in the manner shown in FIG. 14. In FIG. 14, small rolls 10 made of metal are mounted in an inner surface of tube 9 by means of bearings 101 which rotatably support each of the rolls 10 and are recessed in rectangular tube 9, so that only a portion of each roll 10 protrudes from the inner surface of the tube 9.

Figure 15:
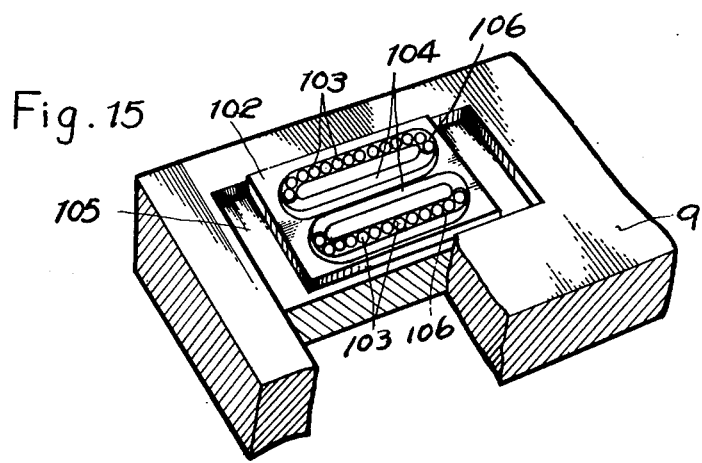
FIG. 15 is an askance view of the rectangular tube provided with flat bearings instead of the rolls shown in FIG. 14, and which shows the manner of providing the tube wall with the flat bearings.

Various means may be employed instead of the rolls 10 shown in FIG. 3. Said means are, in general, called rolling means FIG. 15 shows an example in which balls are used as rolling means. In FIG. 15 flat bearing 12 is buried in rectangular tube 9. Flat bearing 12 is constructed by arranging a number of small balls 103 made of metal along a closed line which is divided into a covered portion 104 and an opened portion 106. In the opened portion 106, small balls 103 are exposed and a portion of each of balls 103 protrudes a little bit. All the remaining portions excluding opened portion 106 are recessed from protruding portions of balls 103. Therefore, if a plate is contacted with the flat bearing 12, the plate is actually contacted only with protruding portions of balls 103. These balls 103 can move along said closed line, that is, from the opened portion 106 to the covered portion 104, or vice versa. A mode of the above structure is normally secured to a plate 105, which is commercially available.

In addition, slide needle bearings may be used as the rolling means in this invention. These rolling means, such as rolls, flat bearings, or slide needle bearings may be mounted over the entire inner surfaces of rectangular tube 9 appropriate intervals depending upon the rigidity of the endless belts.

In the embodiment of the process shown in FIG. 3, the rolling means are mounted on the inner surfaces of rectangular tube 9, and the endless belts are allowed to advance along the inner surfaces of rectangular tube 9 by rolling means. Particularly the endless belts rotate without meandering if the endless belts are maintained in flat state by guide rolls, for example, by guide rolls 51 and 52. Therefore, the passage for molding can be extended in length, and as a result a foamed article can be continuously obtained in high speed. Furthermore, the foamed article can be shaped to have a fixed cross section, even when the foamable liquid expands with a high foaming pressure.

Figure 4:
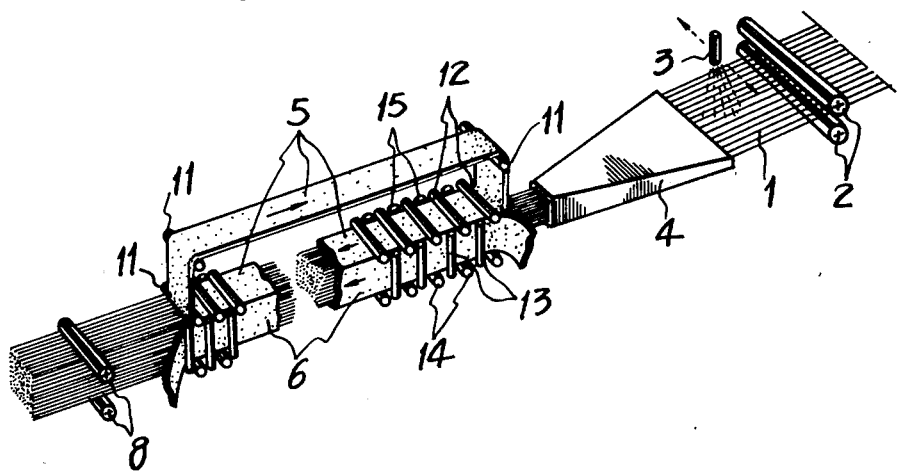
FIG. 4 is an askance view, partly cut away, of another embodiment of the invention, wherein a number of rolls arranged in parallel crosses are provided in lieu of the rectangular tube shown in FIG. 2, to support the endless belts.

In the process shown in FIG. 4, there are used a number of rolls instead of rectangular tube 9 shown in FIG. 2. That is, a passage for molding is constructed from a number of rolls together with the endless belts. The rolls are divided into at least three sets corresponding to the number of endless belts. The rolls which belong to the same set are arranged in parallel relationship to one another and on the same plane. Each set of the rolls intersects with the others to form a rectangular tube having a certain cross section. Sets of the rolls 12 to 15 are located to form a rectangular tube wherein the rolls belonging to the same set are situated so as to be parallel in respective axial directions and on the same plane. Thus, the rolls are arranged in parallel crosses. Each of endless belts 5 and 6 etc. is positioned so as to enclose one set of rolls, and can rotate in contact with said set of rolls in the direction shown by the arrow. Each of said set of rolls is rotated by movement of the endless belts 5 and 6.

In the process shown in FIG. 4, it is necessary to construct a passage for molding by at least three sets of rolls. In this case, it is desirable to arrange each set of rolls so as to intersect each other. Ends of the rolls which belong to the same set are interposed between ends of rolls which belong to another and adjacent set, and accordingly the ends of rolls belonging to different sets intersect alternately.

It is desirable to construct the rolls of materials having rigidity, especially metals. It is needless to state that the rolls should be made so as to rotate freely.

Intervals between the rolls should be determined appropriately taking into consideration the flexibility of the endless belt. Where the endless belt is made of the material having low flexibility and high rigidity, the intervals between the rolls may be extended. Axial length and diameter of the rolls are appropriately determined depending upon the cross sectional dimensions of the liquid containing fibres passing through the passage, and pressing force when the liquid is expanded.

The cross sectional shape of the desired article determines how many sets the rolls should be divided into. For example, if the desired article is a pillar having trigonal cross section, the rolls are divided into three sets and these sets are arranged so as to form a triangular tube or tunnel. If the desired article is a pillar having square section, the rolls are divided into four sets and the sets are arranged so as to form a square tunnel. The tunnel has preferably a cross section which is almost uniform throughout from one end to the other, and may have a cross section which becomes a little more narrower at the inlet side where the foamable liquid is not yet foamed.

In the process shown in FIG. 4, it is not preferable that the endless belt be made of a material which is extremely rich in flexibility because if the endless belt is of high flexibility, then the endless belt tends to be pushed outwardly by foaming pressure exerted by the foamable liquid, and as the result there is obtained a deformed article. Thus, the endless belt is preferably made of metal, especially steel, most preferably stainless steel.

According to the process shown in FIG. 4, there is obtained a foamed article having a smooth and beautiful surface because the foamable liquid is foamed and hardened in contact with the endless belts which advance together with the foamable liquid and hence there is no friction between the foamable liquid and the endless belt. The foamed article has a precisely desired shape at every cross section, because each of the endless belts is supported by a number of adjacent rolls. Moreover, the endless belts can be easily advanced owing to free rotation of the rolls which support the endless belts, and hence the endless belts can be extended in length. Therefore, a foamed article having a fixed cross section can be obtained with good efficiency. Furthermore, mishaps are decreased which are derived from entrance of extraneous substances. In addition, it is easy to heat or cool the endless belts on account of the spaces between the rolls. Thus, the process gives an article of good quality with ease and good efficiency.

In the above processes, the product may be improved by applying a pervious film or sheet to a surface of the foamable liquid, before the liquid is hardened. Such a pervious sheet is, for example, a paper, non-woven fabric or the like, which easily absorbs and passes a liquid substance. In particular, the pervious sheet such as a paper and non-woven fabric is placed on the surface of the endless belt and advanced along with the endless belt so that the pervious sheet may be applied to a surface of the liquid impregnated fibres. The pervious sheet adheres to the foamable liquid and absorbs the liquid to be completely buried in the final article. Thus, the final article is further reinforced by said sheet, and is improved in surface hardness, weatherability and appearance. Further said pervious sheet may contain a resin which can be adhered to the foamable liquid the final article may be further improved in its surface as desired.

Figure 16:
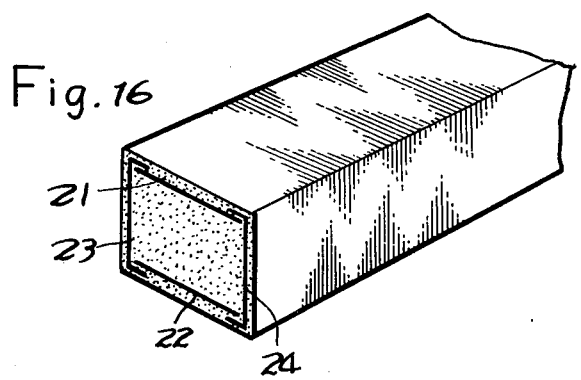
FIG. 16 is an askance view of an obtained article, partly cut away, which shows the manner of applying pervious sheet materials to the article for improving surface property of the article.

In instances where the pervious sheet is employed, it is preferable to apply it so as to cover the entire surface of the final article. For example, in order to obtain a square pillar as shown in FIG. 16, it is preferable to apply four pervious tapes to the liquid impregnated fibres so that each of the tapes may cover one entire surface of the pillar by placing and advancing each tape on the respective endless belt. In order to avoid gaps between the pervious tapes at corner portions of the final article, as shown in FIG. 16, it is preferable to bend both sides of tapes 23 and 24 to overlap sides of the adjacent tapes 21 and 22.

In FIGS. 1 to 4, gathering means 4 is used to disperse evenly and quickly the foamable liquid into the fibres. Said gathering means has a structure such that the cross section thereof varies gradually in order to change the relative position of each of the fibres which are introduced therein and pass therethrough. The gathering means can normally disperse evenly and quickly the liquid into the fibres.

When the foamable liquid is viscous, it often happens that the liquid does not come to be dispersed evenly into the fibres, in spite of the use of gathering means 4. To disperse the viscous liquid into the fibres it has been found effective to introduce the liquid impregnated fibres into a flexible tube and pass them therethrough. In particular, the method which comprises advancing a number of continuous fibres in the state of a bundle, impregnating the fibres with foamable liquid, then introducing said fibres into a resilient tube of a flexible material, pressing the tube from the outside so as to change the shape of the tube while said fibres are passing through the tube whereby a portion of the fibres are allowed to change positions relative to the remaining fibres, thereby dispersing the liquid evenly and quickly into the fibres. Alternatively, the fibres may be placed between two plates and may be crumpled by changing the position of at least one of the plates. Further, a method may be used wherein each of said fibres is passed through a heald, each heald is moved in the opposite direction to a contiguous heald, and each fibre is changed in its relative position to contiguous fibres.

Figure 5:
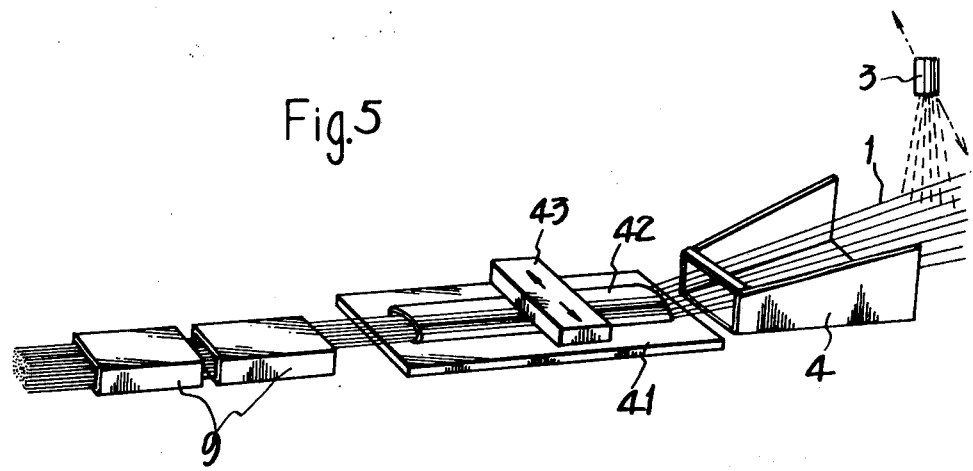
FIG. 5 is an askance view of an embodiment of the invention for impregnating evenly and quickly a multiplicity of continuous fibres with the foamable liquid.

FIG. 5 shows schematically an embodiment of the invention which is suited for dispersing the liquid evenly and quickly into the fibres. In the process, bundle of fibres 1 is at first pinched by a pair of rolls 2 (not shown in FIG. 5) and arranged in a wide range. Then foamable liquid is applied to the fibres emitted from nozzle 3. The liquid applied fibres are then passed through gathering means and thereafter advanced to plate 41 provided with resilient tube 42 on which pressing plate 43 is further placed. Pressing plate 43 is reciprocated in the direction shown by the arrow while pressed to resilient tube 42. The passage for molding 9 is constructed in the same manner as that in FIGS. 2 and 3, and provided with endless belts (not shown in FIG. 5) which can rotate along inner walls of the passage. In the process fibres which have been somewhat evenly impregnated with the foamable liquid are introduced in resilient tube 42 and passed therethrough, while tube 42 is pressed by pressing plate 43 which reciprocates in the directions indicated by arrow, and the liquid is dispersed evenly and quickly into the fibres.

Figure 6:
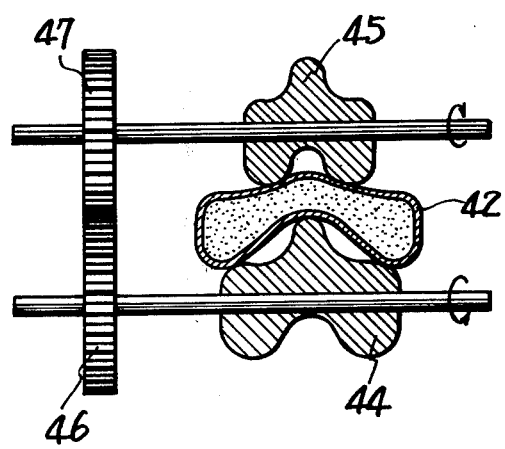
FIG. 6 is a cross-sectional view of another means used for even and quick impregnation of a multiplicity of continuous fibres with the foamable liquid.

Alternatively, resilient tube 42 may be intermittently beaten by plate 43 as opposed to being pressed by the reciprocating motion indicated by the arrow. Moreover, resilient tube 42 may be repeatedly grasped and released or may be deformed by a combination of these. Furthermore, a pendulum may be suspended so that it may reciprocate in the direction perpendicular to the axis of resilient tube 42, and the forward end of it may collide with tube 42. Or, during the time tube 42 is pressed by plate 43, plate 43 may be advanced in the advancing direction of the fibres. Tube 42 may also be pinched by a pair of rolls 44 and 45, as shown in FIG. 6, each of which is rotated by respective gears 46 and 47 engaging each other, whereby tube 42 is constantly deformed irregularly by rotating rolls 44 and 45. The pendulum and rolls are not limited to one or one pair, but may be plural or plural pairs.

In order to disperse evenly and quickly the liquid into the fibres, the following may also be adopted. In the embodiment illustrated in FIG. 5, gathering means 4 and plate 41 which are separated, may be combined into one means as shown in FIG. 7. Gathering means 4 in FIG. 7 is constructed from a bottom plate 41, and partial side walls 411, 412, 413, 414, 415, 416 standing at both sides of bottom plate 41. Crumpling plates 421 and 422 are placed at positions where said side walls are vacant. The crumpling plates can reciprocate in contact with bottom plate 41 in the directions shown by arrows in solid line, and can move intermittently upwardly and downwardly as shown by the dotted arrows so as to contact intermittently with bottom plate 41. The passage for molding 9 has endless belts (not shown in FIG. 7) which enclose respective walls thereof and can rotate along the inner surfaces of the walls.

The process shown in FIG. 7 has the characteristic that the liquid impregnated fibres are introduced into gathering means 4, wherein the fibres are intermittently pressed by crumpling plates 421 and 422, each of which reciprocates in the directions shown by the solid arrows during contact with the fibres, and thus the liquid is dispersed uniformly and quickly into the fibres.

In the process illustrated in FIG. 8, all fibres are allowed to pass through healds 18 or 19 one by one or several at a time. Such healds 18 and 19 reciprocate alternately upwardly and downwardly. In particular, each of healds 18 is interposed between each of healds 19, and both healds 18 and 19 are arranged in parallel and close relationship. When healds 18 move in he upward direction, healds 19 move in the downward direction, and when healds 18 move in the downward direction healds 19 move in the upward direction. Thus, healds 18 and 19 move repeatedly upwardly and downwardly and repeatedly increase and decrease openings between neighboring individual fibres thus the liquid is evenly and quickly dispersed into the fibres. The resulting liquid impregnated fibres are further crumpled by plate 421 on gathering means 4, whereby the liquid is dispersed more evenly and quickly into the fibres. In this case, it is preferable to allow motions of healds 18 and 19 to link with motions of the crumpling plates. That is, if the motions of healds 18 and 19 are linked with the motions of the crumpling plates so that healds 18 and 19 are moved upward or downward during the crumpling plates are away from the fibres, the healds bring about a more conspicuous effect in dispersing the liquid.

Figure 9:
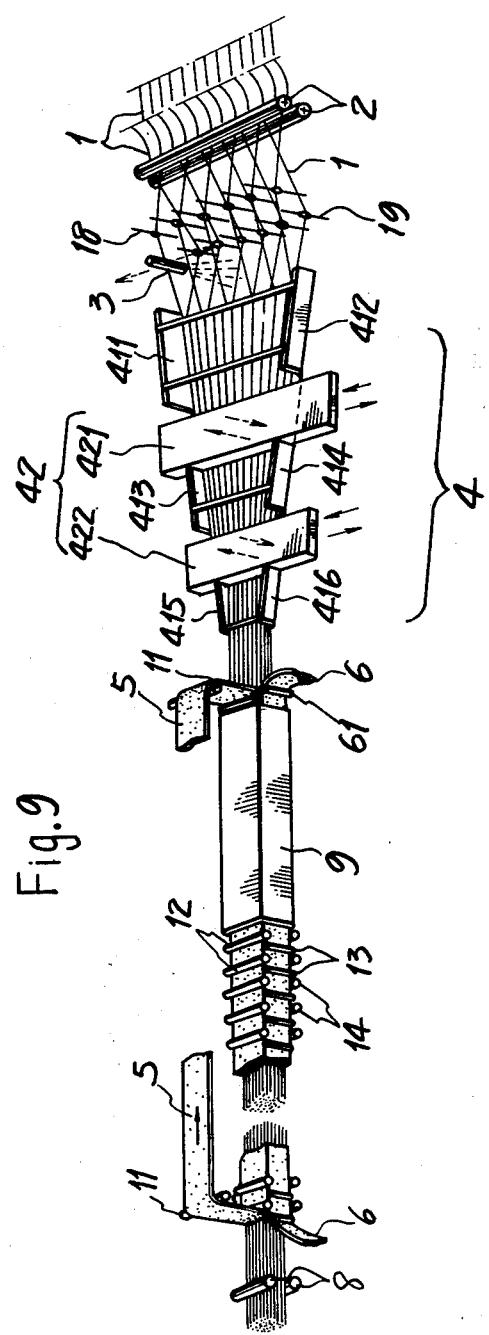
FIG. 9 is an askance view of a preferred embodiment of the invention wherein a step for impregnating continuous fibres with the foamable liquid is combined with a step for molding the resulting impregnated fibres.

FIG. 9 shows another embodiment of the invention. In this embodiment, as in the embodiment shown in FIG. 8, a number of continuous fibres 1 are advanced and the fibres are pinched by a pair of rolls 2 in a wide spread state, and thereafter are passed through healds 18 and 19, and foamable liquid is sprayed thereon. In particular, the fibres are advanced and moved by healds 18 and 19, the liquid is sprayed onto the fibres through nozzle 3 and applied to the fibres and the fibres are introduced into gathering means 4, wherein the fibres are crumpled by plates 421 and 422 to disperse the liquid evenly and quickly into the fibres. The fibres are then introduced into a passage for molding, which is constructed from endless belts 5, 6 etc., a rectangular tube 9, and rolls 12, 13, 14 etc. The endless belts 5, 6 etc. are arranged so as to rotate along respective inner walls of the tube 9 and also along inner side of respective sets of rolls 12, 13, 14 etc. Thus, the endless belts are prevented from expanding outwardly by the tube 9 and then by the rolls 12, 13, 14 etc., and as a result a desired article having a uniform rectangular section is easily obtained.

According to above-mentioned processes, there is obtained a desired article which is of a thermosetting resin reinforced by a number of continuous fibres evenly distributed therein and, wherein said resin is produced by hardening during a short time. The article is uniformly foamed and has normally no skin which is unfoamed or foamed to low degree. If the article appears to have any observable skin, the skin is extremely thin, and it may be said that the article has substantially no skin.

It is sometimes desirable to obtain a foamed article which has a skin that is unfoamed or foamed to low degree, and an inner portion that evenly and highly foamed. Particularly where surface hardness and good weathering property are required, and when mechanical strength such as bending strength is required.

In view of the above, there is further provided an improved process for preparing a foamed article having high density surface skin, which process comprises cooling the endless belts in order to produce a low density surface portion. Embodiments of said improved process are shown in FIGS. 10 and 11.

This invention further provides a process for continuous preparation of a shaped article of a foamed thermosetting resin having high density surface skin and reinforced by a number of continuous fibres, which comprises advancing a number of continuous fibres in parallel relationship to each other, impregnating the fibres with foamable liquid which is at first in liquid state and thereafter hardens to form a resin in a relatively short time, providing a passage for molding which is at least constructed from three endless belts, introducing the liquid impregnated fibres into the passage for molding to advance the fibres in contact with the endless belts, cooling the endless belts prior to or during contact with the liquid impregnated fibers, and allowing the liquid to harden and foam in the passage for molding to give a porous shaped article in a form corresponding to a section enclosed by the endless belts. Embodiments of above process are shown in FIGS. 10 and 11.

The process shown in FIG. 10 is the same as that shown in FIG. 4, except that there is provided cooling boxes 16, which cool each of the endless belts. FIG. 10 shows only one cooling box which cools endless belt 5, although similar cooling boxes are required in order to cool the other endless belts such as endless belt 6.

In the process shown in FIG. 10, fibers 1 are at first pinched by rolls 2 and spread in a wide range to a thin, sheet-like state. As fibers 1 advance in this state, a foamable liquid is applied the fibers. Then the fibers enter into gathering means 4, wherein the fibers are gathered into a pillar-like state having a square section and at the same time the liquid is dispersed evenly and quickly into the fibers. Thereafter, the fibers advance in contact with and enclosed by endless belts 6 and 5. These endless belts are supported by guide rolls 11 and contact sets of rolls 12, 13, 14 and 15, all of which can be rotated freely. As the fibers advance in contact with the endless belts, the liquid contained in the fibers is allowed to foam and harden into a solid resin, and as the result a foamed article is obtained. During this time the liquid contained in the fibers is enclosed and confined by the endless belts supported by sets of the rolls and the foamed article is imparted with a cross section corresponding to that of the passage for molding. With respect to these aspects, the process shown in FIG. 10 is just the same as the process shown in FIG. 4.

The process shown in FIG. 10 is different from the process of FIG. 4 in that the endless belts are cooled by cooling boxes 16, and consequently in that the liquid contained in the fibers is cooled at its outer surfaces by contacting the endless belts. In general, the liquid contained in the fibers has a low heat conductivity and is cooled only in its surface portions. As the result, foaming of the liquid contained in the fibers is delayed at its surface portions, but in its inner portions is foamed as usual. Thus, the liquid contained in the fibers remains unhardened and foamed to a low degree at its surface portions, but its inner portions are hardened and highly foamed. Consequently, pores in the surface portions tend to be squeezed by foaming pressures from the inner portions. Thus, the liquid produces a foamed article which has highly and evenly foamed resin layer in the inner portion, and a low foamed layer in the outer portion, which layer is of comparatively large thickness.

In FIG. 10, cooling box 16 is mounted on a position wherein the endless belt 5 is cooled prior to contact with the liquid impregnated fibers. However, the location wherein the endless belt is cooled is not limited to said position. As shown in FIG. 11, cooling box 17 may be mounted at a position wherein endless belt 5 is cooled after the belt 5 has contacted the liquid impregnated fibers. In this case, the cooling box 17 is preferably of the structure that portions of the endless belts are altogether covered with a box wherein a cooling medium is circulated so as to cool the endless belts.

As for the cooling temperature, it cannot be set forth broadly because it may vary according to many factors. For instance, the cooling temperature should be changed according to the type of the liquid which is used for producing the foamed resin and especially according to hardening velocity of the liquid, the kind of foaming agent, the foaming degree and dimensions of a desired article, and the advancing velocity of the fibers. In general, if the liquid generates a large amount of heat when hardened, it is not required to cool strongly, but if the liquid generates only a small amount of heat, it is required to cool strongly. In the event the foaming agent is of the type that it decomposes to generate gas, it is required to cool strongly, but if the foaming agent is of the type that it evaporates, it is not required to cool as much. If it is desired to obtain a highly foamed article, it is not required to cool as much as when a low foamed article is desired. Cooling should be greater when it is desired to obtain an article having a small cross sectional area, than when an article having a large cross sectional area is desired. The optimum temperature is generally determined by experimentation.

In general, the liquid is normally at room temperature immediately before the liquid contacts the endless belts, and therefore the optimum cooling temperature can be stated with reference to a temperature difference based on the room temperature. According to experiments wherein it is desired to obtain foamed square pillars having a cross section of several square cm. by the use of glass fibers and polyurethane or polyester resin, it was found preferable that the temperature difference be within a range of from 5° to 40° C, that is, the temperature of the endless belt be lower than that of the room temperature by 5° to 40° C, and most preferable by 5° to 20° C.

It is not required that all the endless belts be cooled to an identical temperature. For example, an endless belt comprising the bottom of the passage for molding may be at higher temperature than the other endless belts, because said endless belt will first and originally contact the liquid impregnated fibers. If said endless belt is cooled to the temperature of the other endless belts, an obtained article may have the low foamed surface portion especially having a big thickness at the bottom surface of the article. Formation of low foamed surface portion is especially remarkable at the bottom portion of the article, when there is used a liquid which exerts high foaming pressure and a foaming agent which produces gas by evaporation. Under these circumstances care must be taken so as to maintain the temperature of the bottom endless belt higher than that of the other endless belts.

According to the processes shown in FIGS. 10 and 11, there is obtained a foamed resin article which has a desired cross section just equal to the dimensions confined by the endless belts, in which a number of continuous fibers are distributed evenly in the foamed resin, and which has a low foamed or unfoamed surface skin of a desired thickness and a highly, uniformly foamed inner portion. The obtained article has mechanical properties that are superior to the evenly foamed article.

Following examples will serve to illustrate the present invention.

EXAMPLE 1

In this example it was intended, using as a foaming agent a liquid composition for use in preparing polyurethane, to obtain a pillar-shaped article of polyester resin reinforced by glass fibres which had a square cross section, by means of apparatus illustrated in FIG. 2.

400 monofilament glass fibres of 9 microns in diameter were made into a strand, and 90 of those strands were made into a roving, and 54 of those rovings were arranged in a sheet-like form and advanced continuously.

The foamable liquid composition which produced a foamed thermosetting resin was prepared by mixing 100 parts by weight (hereinafter part(s) by weight is simply referred to part(s)) of Polylite 8010 (a prepolymer of unsaturated polyester in which styrene monomer is contained 30% by weight manufactured by Dai Nihon Ink K.K.), 1 part of benzoyl peroxide, 3 parts of dimethylaniline, 3 parts of water, 1 part of Silicon L-5320 (which is manufactured by Union carbide Co.), 5 parts of triethanol amine, and 45 parts of Desmodur 44V (which is 4,4'-diphenylmethane di-isocyanate made by Dayor Co.). The cream time of the liquid composition was 75 seconds, under the normal temperature ($15°$ C), the rise time was 180 seconds, and the set time was 300 seconds.

Spraying said liquid composition from nozzle 3 at the rate of 400 g/min. over said arranged rovings, which were advanced at the speed of 65 cm/min., thus the liquid composition was dispersed evenly in rovings by passing them through gathering means 4. The liquid dispersed rovings were confirmed that they had such a foaming power that when they were allowed to expand freely, the cross-sectional area of the foamed article became 62 $cm^2$.

A square tube was used for constructing a passage for molding, which was made of iron plate having a thickness of 5 mm and was formed in the inside cross-sectional dimensions of 45 mm × 45 mm and in a length of 8 m. Four endless belts were mounted on each of the inner surfaces of the tube. In particular, endless belts having a width of 45 mm and thickness of 1 mm were mounted on upper and lower inner surfaces of the tube, and endless belts having a width of 43 mm and thickness of 1 mm were mounted on right and left inner surfaces of the tube, all these belts being made of stainless steel. All of these endless belts were supported by guide rolls located at both ends, and were made easily rotatable with a slight power along the inner surfaces of the tube. A lubricating oil was applied between the endless belts and inner surfaces of the tube.

Said rovings impregnated with the liquid were introduced into the passage for molding. In the passage for molding, plate heaters were provided so as to surround a portion of the outer surfaces of the tube, said portion being in the range beginning at 2 m away from the inlet end of the tube and terminating at 5 m away from said inlet end. Thus, the walls of the tube were heated to the temperature of $120°$ C. 2 m away from said range, there were provided cooling jackets on the tube in the range having the length of 1 m on the outlet side of the tube, and cooling water was circulated into the jackets so as to cool the walls. The endless belts were rotated by advancing rovings, and accordingly a shaped article was easily removed from the endless belts at the outlet end of the tube.

Thus obtained shaped article had cross-sectional dimensions of 43 mm × 43 mm, which was just corresponding to a desired shape, and had a glossy fine appearance. It had a specific gravity of 0.48, flexural elastic modulus of 505 kg/$mm^2$, compressive modulus of 137 kg/$mm^2$, flexural strength of 6.5 kg/$mm^2$, and compressive strength of 4.2 kg/$mm^2$, It had properties resembling a hard, strong natural wood timber. It could easily be sawed, planed, and jointed each other by driving nails.

EXAMPLE 2

In this example it was intended to obtain a pillar-shaped article of polyurethane resin reinforced by glass fibres which had a square cross section, using the same apparatus as in example 1. Further in this example it was also intended to improve weatherability of the article by applying non-woven fabric to the surface of the article.

Identical glass fibres as used in example 1 were used. A liquid composition which produced a foamed thermosetting resin was prepared by mixing 100 parts of Polyol RQ-500 (which was polyether having 400 value of hydroxyl group and manufactured by Dai Nihon Ink K.K.), 1 part of Silicon L-5320 (silicon surfactant), 1 part of water, 0.5 part of dibutyl tin dilaurate, and 120 parts of Desmodur 44V. The cream time of the liquid composition was 90 seconds under the normal temperature ($15°$ C), the rise time was 150 seconds, and the set time was 315 seconds.

Apart from said composition there was prepared another material for use in surface covering, by impregnating non-woven fabric of polyester fibres (containing binders at the rate of 75 g/$m^2$, sold under the name of H-8007 from Nihon Bairin Co.), with a liquid composition of 100 parts of Polylite 8010, 4 parts of lauryl peroxide and 1 part of paraffin wax in the ratio of 100 g/$m^2$.

The liquid composition for the foamable resin was sprayed from nozzle 3 at the rate of 350 g/min. over a bundle of said rovings, which was advanced into gathering means 4 at the speed of 65 cm/min. by means of the same apparatus as in example 1. Thus the liquid composition was dispersed evenly in the bundle of rovings. Said bundle of rovings had such a foaming power that when it was allowed to expand freely, the cross-sectional area of the foamed article became 84 $cm^2$.

Thereafter tapes of said material for use in surface covering were inserted between the bundle of rovings and each of the endless belts to apply them to the outer surface of the bundle, just before said bundle of rovings was introduced into the tunnel enclosed by four endless belts. Thus, non-woven fabric was skillfully applied over the surfaces of the bundle of rovings and said bundle of rovings was made into a shaped article.

Thus obtained pillar-shaped article had an improved weatherability in comparison with the article which was prepared without using said material, due to existence of said material covering the surface of the article. This was made clear from the results that, when the two articles were exposed in Sunshine weatherometer for 500 hours, the article without said material showed considerable change in color ranging from light yellow to light brown and cracked, and fibres came out to the surface, while the article which was obtained according to the method of this example was slightly tinged with brown and there was no observable change in the surface and the appearance.

The pillar-shaped article had a specific gravity of 0.44, flexural strength of 4.8 kg/mm$^2$, flexural elastic modulus of 560 kg/cm$^2$, coefficient of linear thermal expansion of $1.27 \times 10^{-5}$, and properties as seen in hard and strong timber. And it could easily be sawed, planed, and jointed each other by driving nails. Therefore, it could be used for construction materials.

EXAMPLE 3

In this example it was intended to obtain a pillar-shaped article of polyurethane resin containing glass fibers having a square cross section, using the apparatus illustrated in FIG. 3 with, however, said apparatus having flat bearings 105 as shown in FIG. 15 instead of rolls, and said flat bearings being spread all over inner surfaces of tube 9.

400 monofilament glass fibres of 9 microns in diameter were made into a strand, and 90 of those strands were made into a roving, and 200 of those rovings were arranged in a flat form and advanced continuously.

A liquid composition which produced a foamed thermosetting resin was prepared by admixing 100 parts of polyether (having 400 value of hydroxyl group), 1 part of silicon oil, 1 part of water, 0.5 part of dibutyl tin dilaurate, and 120 parts of crude 4,4'-diphenyl methane diisocyanate. The cream time of the liquid composition was 90 seconds under the normal temperature (15° C), the rise time was 150 seconds, and the set time was 315 seconds.

Said composition was sprayed from nozzle 3 at the rate of 1300 g/min. over a bundle of said rovings, which were arranged in a flat form and were advanced at the speed of 50 cm/min., while the nozzle was reciprocated in the directions as shown by the dotted arrows in FIG. 3. Liquid sprayed rovings were made to pass through gathering means 4, and thus said liquid composition was dispersed evenly in the bundle of rovings. Said bundle of rovings had such a foaming power that when it was allowed to expand freely, the cross-sectional area of the foamed article became 250 cm$^2$.

As an element in a passage for molding was used a square tube, which was made of iron plate having the thickness of 5 mm and was formed in inside cross-sectional dimensions of 110 mm × 110 mm and in a length of 8 m. A number of flat bearings having the thickness of 5 mm were spread over all inner surfaces of said square tube. Four endless belts were provided in contact with said flat bearings to form the passage for molding. In particular, two endless belts having the width of 100 mm and thickness of 1 mm were mounted on upper and lower inner surfaces of the tube, respectively, and the other two endless belts having a width of 98 mm and thickness of 1 mm were mounted on right and left inner surfaces of the tube, all these belts being made of stainless steel. Each of those endless belts was supported by guide rolls located at both ends, and was made easily rotatable with a slight force along inner surfaces of the tube. Lubricating oil was applied between the endless belts and the inner surfaces of the tube.

Said rovings impregnated with the liquid were introduced into the passage for molding. In the passage for molding, plate heaters were provided so as to surround a portion of outer surface of the tube, said portion being in the range beginning at 2 m away from the inlet end of the tube and terminating at 5 m away from said inlet end. Thus, the walls of the tube were heated to a temperature of 120° C. 2 m away from said range, there were provided cooling jackets on the tube in the range of 1 m in the axial direction on the outlet side of the tube, and cooling water was circulated into the jackets so as to cool the walls. The endless belts were rotated by advancing rovings, and accordingly a shaped article was easily removed from the endless belts at the outlet end of the tube.

The thus obtained shaped article had cross-sectional dimensions of 98 mm × 98 mm, which was just corresponding to a desired shape, and had a glossy fine appearance. It had a specific gravity of 0.45, flexural elastic modulus of 423 kg/mm$^2$, flexural strength of 6.39 kg/mm$^2$, compressive strength in the longitudinal direction of 3.92 kg/mm$^2$, and properties as seen in hard and strong timber. It could easily be sawed, planed, and jointed each other by driving nails.

EXAMPLE 4

This example was carried out using the same apparatus and identical materials as those in example 3. Further in this example it was intended to improve weatherability by applying non-woven fabric to the surface of the article.

There was used a surface covering material, which was prepared by impregnating non-woven fabric of polyester fibres having binding agents in the ratio of 75 g/m$^2$ (traded under the name of H 8007 and manufactured by Nihon Bairiin), with a liquid composition of 100 parts of Polylite 8010, 4 parts of lauryl peroxide and 2 parts of paraffin wax, in the ratio of 100 g/m$^2$.

Said covering material was inserted between the rovings and endless belts to cover the entire surfaces of said rovings, just before the rovings were introduced into a tunnel enclosed by said four endless belts. Thus, non-woven fabric was skillfully applied to the entire surfaces of a bundle of rovings and said bundle of rovings could be made into a shaped article.

Thus obtained pillar-shaped article was improved in weatherability in comparison with the article which was prepared without using the covering material due to existence of the covering material on the surfaces of the article. This was made clear from the fact that when the two articles were placed in Sunshine weatherometer and exposed in the radiation for 500 hours, the article without the covering material showed considerable change in color ranging from light yellow to light brown, and cracked, and fibres came out to the surface, while the article having the covering material was tinged slightly with brown and there was no observable change in the surface and the appearance.

The other properties of the article of this example were about the same as those of the article of example 3.

EXAMPLE 5

In this example, it was intended to obtain a pillar-shaped article of foamed polyester resin containing glass fibres, using as a foaming agent a liquid composition for producing urethane resin, and using the same apparatus as shown in FIG. 4.

As for the glass fibres used herein, 200 of glass rovings were arranged in a flat form and were advanced continuously, wherein each of the rovings was composed of 90 strands, each of the strands was further composed of 400 monofilaments of glass having a diameter of 9 microns.

As for the liquid composition used herein, it prepared by mixing 100 parts of unsaturated polyester resin (containing 30% by weight of styrene monomer), 1 part of benzoyl peroxide, 3 parts of dimethyl aniline, 3 parts of water, 1 part of silicon oil, 5.5 parts of triethanolamine, and 30 parts of crude 4,4′-diphenyl methane diisocyanate, and the resulting mixture was used as the foamable liquid composition. The cream time of the liquid composition was 100 seconds at the room temperature (15° C), the rise time was 200 seconds, the tack free time 600 seconds, and the set time 630 seconds.

While said rovings were arranged in a flat form and advanced at the speed of 50 cm/min., said liquid composition was sprayed at the rate of 1300 g/min. onto said rovings from nozzle 3, wherein nozzle 3 was reciprocated in the directions indicated by the arrows in dotted lines. Thus, the liquid composition was provided in the rovings and evenly dispersed into the fibres by introducing the rovings into gathering means 4 and passing therethrough. Said rovings had such a foaming ability that they were foamed to an article having the cross-sectional area of about 300 cm², when they were exposed to free expansion.

As to the passage for molding, rolls were used in order to construct the passage as shown in FIG. 4. The rolls, which were indicated by numeral references 12 to 15, had a diameter of 38 mm. Among these, rolls 12 and 14, which were located on upper and lower sides, had a length of 400 mm, and rolls 13 and 15, which were located on right and left sides, had a length of 95 mm. The upper and lower rolls 12 and 14 were arranged so as to protrude at corners of the passage for molding, and the right and left rolls 13 and 15 were arranged so as to be contained between the upper and lower rolls, thus these rolls formed a tunnel which had a square cross section. Endless belts 5 and 6 were mounted on the rolls. Upper and lower endless belts, for example endless belt 5, had a thickness of 1 mm and width of 102 mm. Right and left endless belts, for example endless belt 6, had the thickness of 1 mm and width of 100 mm. Intervals between adjacent rolls arranged on the same plane, for example intervals of adjacent rolls belonging to rolls 5, were 80 mm, and each of rolls 6 was located in the middle of the intervals. Thus, the rolls formed a tunnel having a length of 8 m. Said tunnel was located so that the inlet of the tunnel was away from nozzle 3 by 0.5 m. Said endless belts could be rotated easily along the rolls.

Said rovings which had been impregnated with the liquid composition, were introduced into a space enclosed by said endless belts. The outside of the passage for molding was not heated, but cooled only at the outlet side in the range of 2 m from the outlet end by mounting cooling jackets wherein ice water was circulated. The endless belts were easily rotated by advancement of the fibres, and a foamed article was easily removed from the endless belts. Total power was only 1.5 tons which was required to pull out the article from the passage for molding.

Thus obtained article had cross-sectional dimensions of 100 mm × 100 mm, which was just corresponding to a desired shape, and had a glossy fine appearance. In the article, glass fibres run in the longitudinal direction of the article and were evenly dispersed, and the resin was foamed uniformly. The article looked like a natural wood timber in appearance and had a specific gravity of 0.41.

EXAMPLE 6

In this example, it was intended to obtain a pillar-shaped article of foamed polyurethane resin, using glass fibres, a liquid composition for use in producing polyurethane as materials, and a passage for molding which was constructed from a square tube, a number of rolls and endless belts. Said tube was made of iron plate and located at the inlet side of the passage.

The glass fibres used herein were identical with those in example 5.

As for the passage for molding, said tube was located in the range of 3 m from the inlet end, and had inner cross-sectional dimensions of 102 mm × 102 mm, at a distance of 10 cm from the tube, rolls were arranged in parallel crosses which were identical with those of example 5 in their arrangement, however, the passage used herein was decreased in length and had a length of 6 m.

The endless belts had the identical thickness and width as those used in example 5, and were arranged so as to extend through the tube and rolls and to be able to rotate along the tube and rolls.

The liquid composition used herein was a mixture of 100 parts of polyether (400 value of hydroxyl group), 1 part of silicon oil, 1 part of water, 0.4 part of dibutyl tin dilaurate, and 120 parts of crude 4,4′-diphenylmethane diisocyanate. The cream time of the liquid was 100 seconds at 20° C, the rise time was 150 seconds, the tack free time was 140 seconds, and the set time was 360 seconds.

While said rovings were advanced at the speed of 50 cm/min., said liquid composition was sprayed on the rovings at the rate of 1500 g/min. from nozzle 3, wherein nozzle 3 was reciprocated in the directions indicated by the arrows in dotted lines. Thus, the liquid composition was provided in the rovings and then evenly dispersed into the fibres by introducing the rovings into gathering means 4 and passing therethrough.

Said rovings were then introduced into a space enclosed by four endless belts, wherein the tube in the passage was not heated. Cooling jackets were mounted on a portion of the passage, said portion being in the range of 3 mm from the outlet end and in said portion the rolls being arranged in parallel crosses. Ice water was circulated in the cooling jackets to cool the endless belts. The endless belts were easily rotated by advancement of the fibres, and a foamed article was easily removed from the endless belt. Total power was 6.5 tons required to pull out the article from the passage for molding.

The obtained article had a cross section of 100 mm × 100 mm, specific gravity of 0.45, and could be used as a natural wood timber in the field requiring high mechanical strength.

EXAMPLE 7

In this example was used the apparatus shown in FIG. 5, except that crumpling rolls as shown in FIG. 6 were used instead of crumpling plates 41 and 43. Fibres used herein were a bundle of glass fibres which were composed of 160 glass roving having 20,000 deniers. The rovings were arranged in parallel relation.

Liquid composition was for use in producing foamed polyurethane. The composition was prepared by mixing 100 parts of polyether (hydroxyl group value 400), 0.5 part of dibutyl tin dilaurate, 0.1 part of water, 1 part of silicon oil (L 5320) and 120 parts of 4,4'-diphenyl methane diisocyanate. The cream time of the liquid composition was 120 seconds, and the rise time was 210 seconds.

Gathering means 4 was, as shown in FIG. 5, of the structure that the inlet opening was 10 cm in height and 40 cm in width, and the outlet opening was a square of 5 cm × 5 cm, and length of the bottom plate was 40 cm in the advancement direction of the fibre.

Flexible tube 42 was made of butyl rubber and had an inner diameter of 5 cm and length of 30 cm. Flexible tube 42 was pinched by a pair of rolls 44 and 45 as shown in FIG. 6, and gears 46 and 47 were rotated at the rate of 30 r.p.m., thus the flexible tube was compressed by the rolls.

While said bundle of fibres were advanced in the speed of 50 cm/min., said liquid composition was applied to the bundle, then the bundle was introduced into flexible tube 42. In this case, the cross-sectional area ratio of the bundle containing the liquid composition to the flexible tube 42 was rendered to 1 : 3. The bundle containing the liquid composition had such a foaming ability that it produced a foamed article having a cross-sectional area of 48 cm$^2$, when it was placed under free expansion.

Said bundle containing liquid composition was introduced into a passage for molding, which was constructed from endless belts as shown in FIG. 1, and which had cross section of 4.5 cm × 4.5 cm and length of 5 m. When the bundle was passed through the passage for molding, the inlet portion of the passage within the range of 1 m in length from the inlet end was heated, while the outlet portion of the passage within the range of 1 m length from the outlet end was cooled.

Thus, an elongated foamed article was obtained in which the glass fibres run in the longitudinal direction of the article and are evenly dispersed in the article. When a cross section of the article was taken, the glass fibres and foamed resin were so uniformly dispersed that the former could not be distinguished from the latter. When physical properties were measured as to the article, it had a flexural strength of 585 kg/cm$^2$, and a flexural elastic modulus of 6.05 ×10$^4$ kg/cm$^2$, thus it was considered as having good properties.

EXAMPLE 8

In this example was used a bundle of glass fibres which were composed of 36 rovings arranged in parallel relationship wherein each of said rovings was composed of 90 strands, each of said strands being further composed of 400 monofilaments having the diameter of 9 microns. Said bundle, therefore, could be said to have 2,160,000 deniers.

Liquid composition used herein was unsaturated polyester resin, which was prepared by mixing 100 parts of Polylite 8010(manufactured by Dai Nihon Ink Co.), 5 parts of benzoyl peroxide (catalyst) and 5 parts of 50% solution of dimethyl aniline in styrene monomer (polymerization accelerator). The gelling time of the liquid composition was 105 seconds at 20° C.

There was used the apparatus shown in FIG. 7, wherein gathering means 4 included two crumpling plates 421 and 422. In particular, gathering means 4 has bottom plate 41 and side walls 411, 412, 413, 414, 415, 416 standing at both side portions of said bottom plate 41, and the crumpling plates 421 and 422 are mounted on portions where said side walls are vacant. Each of crumpling plates 421, 422 are intermittently moved in the directions indicated by the arrows in dotted lines, and are reciprocated in the directions indicated by the arrows in solid lines while in contact with bottom plate 41. Thus, fibres are crumpled by crumpling plates 421, 422 and the bottom plate during passing through gathering means 4.

While said rovings were advanced at the speed of 50 cm/min., said liquid composition was sprayed on the rovings at the rate of 120 g/min. from nozzle 3, said nozzle was reciprocated in the directions indicated by the arrows. Thus, the rovings were provided with about 100% amount of the liquid composition based on the weight of the rovings. Crumpling plates 42 and 422 had a width of 10 cm and weight of 10 kg, and after having contacted the rovings for 5 seconds, the crumpling plates were lifted upward and remained untouched with the rovings for 5 seconds. During contacting with the rovings the crumpling plates were reciprocated in a direction perpendicular to the rovings in a distance of 10 cm.

Thus, the liquid composition was evenly dispersed into the bundle of the rovings, then the bundle was introduced into the passage for molding 9 and passed therethrough. The passage for molding 9 had an inner cross section of 70 cm × 25 cm and a length of 8m. The passage for molding 9 was provided with endless belts, which are not shown in FIG. 7. Further, the passage for molding 9 was provided with heating means, and during passing through the passage, the liquid composition was heated to be hardened and foamed. Thus, a foamed article was obtained.

The obtained article contained a number of glass fibres which were running in the longitudinal direction of the article and evenly dispersed in the uniformly foamed resin. Considerably big pores or gaps were not observed in any cross sections of the article.

EXAMPLE 9

In this example was used a bundle of glass fibres which were composed of 200 rovings arranged in parallel relationship, wherein each of said rovings was composed of 180 strands, each of said strands being further composed of 200 monofilaments having a diameter of 9 microns. Said bundle, therefore, could be said to be about 12,000,000 deniers.

The resin used herein was polyurethane. The liquid composition was prepared by mixing 100 parts of polyether (Trade Name was Hiplox RQ-500, a polyether polyol manufactured by Dai Nihon K.K. having an OH value of 410 ± 15; a viscosity (cps) at 25° C of 1,850 ± 200; a pH of 5–7; an acid value of less than 0.2% and a water content of less than 0.1%) 1 part of slicon oil (L-5320 manufactured by U.C.C. Co.), 1 part of water, 0.4 part of dibutyl thin dilaurate, and 120 parts of crude 4,4'-diphenyl methane diisocyanate. The cream time of the resulting mixture was 100 seconds at 20° C, the rise time was 150 seconds, the set time was 360 seconds.

The apparatus used herein was as shown in FIG. 8 except that gathering means was provided with two crumpling plates as shown in FIG. 7. Each of the strands was passed through a heald, and every other heald was alternately moved upwardly and downwardly. Gathering means was provided with two crumpling plates as stated above, and each of the; crumpling plates had a length of 10 cm in the advancement direction of the rovings and a weight of 15 kg. Both crumpling plates were independently and intermittently lifted to 5 cm height and lowered to the bottom plate of the gathering means every four minutes, and during contact with the gathering means the crumpling plates were independently reciprocated in a direction perpendicular to the advancement direction of the rovings so as to crumple the rovings.

The healds were moved with respect to the movement of the crumpling plate located close the healds. That is, the healds were moved upwardly and downwardly while said crumpling plate was lifted and remained untouched with the bottom plate of the gathering means, and thus while said crumpling plate was lifted the healds changed their positions by halves. Therefore, the healds were moved at a cycle of 15 times/min.

Said rovings were introduced into gathering means, wherein said liquid composition was evenly distributed on the rovings by the movements of the healds and evenly dispersed into the rovings by movements of the crumpling plates; thus the bundle of rovings wherein the liquid composition was utterly uniformly dispersed was obtained. Said bundle of rovings was then introduced into a passage for molding and passed therethrough.

The passage for molding had an inner cross section of 10 cm × 10 cm and a length of 8 m. The passage for molding was provided with endless belts, which are not shown in FIG. 8. During passing through the passage for molding, the liquid composition completed hardening and foaming.

Thus obtained foamed article contained a number of glass fibres which run in the longitudinal direction of the article and were evenly dispersed in the fomed resin. The article contained further uniformly foamed resin. Moreover, the resin penetrated into the every inner portion of the rovings, and the resin presented an excellent affinity to the rovings.

When the physical properties were measured, the foamed article had a specific gravity of 0.45, a flexural strength of 5.09 kg/mm$^2$, a flexural elastic modulus of 530 kg/mm$^2$, and compressive strength in the longitudinal direction of 2.64 kg/mm$^2$. Further, the article had appearance and properties resembling natural wood, and was suited for a constructing material.

EXAMPLE 10

In this example it was intended to obtain a pillar-shaped article off foamed polyurethane containing glass fibre, using the apparatus shown in FIG. 9.

A bundle of glass fibres were used which were composed of 200 rovings arranged in parallel relationship, wherein each of said rovings was composed of 180 strands, each of said strands being further composed of 200 monofilaments having a diameter of 9 microns.

The liquid composition used herein was prepared by mixing 100 parts of the polyether (Trade Name: Hiplox RQ-500, manufactured by Dai Nihon Ink Co.), 1 part of silicon oil (L-5320 manufactured by U.C.C. Co.), 1 part of water, 0.4 part of dibutyl tin dilaurate, and 120 parts of crude 4,4'-diphenyl methane diisocyanate. The cream time of the resulting mixture was 100 seconds at 20° C, the rise time was 150seconds, and the set time was 360 seconds.

Said bundle of the rovings were arranged in parallel and flat relationship and each of said rovings was passed through a heald number of heald were arranged so that every other healds might be raised and lowered by turn. While said rovings were advanced at the speed of 50 cm/min., the liquid composition was sprayed to the rovings at the rate of 1500 g/min., from nozzle 3, which was reciprocated in the directions indicated by arrows. In this case, the healds were moved upwardly and downwardly during crumpling plate was raised upward, therefore, the healds were alternately moved up and down at a cycle of 15 times/min.

Each of crumpling plates 421 and 423 was made of iron, had a length of 10 cm in the advancement direction of the rovings and a weight of 15 kg. Each of crumpling plates 421 and 422 was intermittently moved upwardly and downwardly, that is, the plates were away and in the height of 5 cm from the bottom plate of gathering means for 4 seconds and were contacted with the bottom plate for 4 seconds repeatedly. While crumpling plates 421 and 422 were in contact with the bottom plate of gathering means, crumpling plates 421 and 422 were reciprocated within the range of about 10 cm in the direction perpendicular to the advancement direction of the rovings to crumple the rovings.

Said rovings were crumpled in gathering means 4, and thus the liquid composition was uniformly dispersed into the rovings. Thereafter the rovings were further introduced into a passage for molding.

The passage for molding had the structure shown in FIG. 9, which was constructed from square iron tube 9, rolls arranged in parallel crosses 12 to 14, and endless belts 5, 6. Square iron tube 9 existed at the inlet side of the passage and had a length of 4 m, an inner cross section of 102 × 102 mm, while rolls arranged in parallel crosses 12 to 14 (rolls 15 were abbreviated in FIG. 9) existed at the outlet side of the passage and had the length of 4m thus the total passage had the length of 8 m. Endless belts 5, 6 and the like were mounted on both square iron tube 9 and the rolls arranged in parallel crosses 12 to 14 so as to be able to rotate along inner surfaces of square iron tube 9 rolls 12 to 14.

In particular, each of rolls 12 to 14 had a diameter of 38 mm, upper and lower rolls 12 and 14 had a length of 400 mm, and right and left rolls 13 had a length of 95 mm. Rolls 12 to 14 and the like were arranged in parallel crosses so as to form a square inner cross section having dimensions of 102 mm × 102 mm, by locating upper and lower rolls 12 and 14 so that each end of rolls 12 and 14 might project, while each end of the right and left rolls 13 might not enter into an opening between ends of upper and lower rolls 12 and 14. In this case, said opening, i.e., distance between adjacent rolls which were located on the same plane was maintained at 80 mm, and an axis of the crossing rolls was inserted into the opening. Therefore, the upper rolls and lower rolls were symmetrically arranged, and right and left rolls also symmetrically arranged with respect to the axis of the passage.

Said endless belts 5, 6 and the like had a thickness of 1 mm, and upper and lower endless belts such as belt 5 had width of 102 mm, while right and left endless belts such as belt 6 had a width of 100 mm. All the endless belts could be rotated along respective inner surfaces of tube 9 and rolls 12 to 14, because the rolls 12 to 14 were able to rotate freely and further tube 9 was provided with rolling means (not shown in FIG. 9). Especially, the endless belts could be easily rotated by a little amount of force.

While the rovings were passing through the passage for molding, the passage was not heated from the outside, but was cooled at the outlet side which extended over the length of 2 m from outlet end, by providing said range with cooling jacket and circulating ice water into the jacket. By advancement of the rovings, the endless belts were rotated along with the rovings and were easily removed from the surfaces of a foamed article at the end of the passage, and thus the foamed article was obtained.

The foamed article was a square pillar having a cross section of 100 mm × 100 mm, which was just corresponding to a desired shape, and had a glossy and beautiful appearance. The article contained a number of glass fibres which run in the longitudinal direction of the article and were evenly dispersed in the uniformly foamed resin, said resin penetrating into every strand of glass fibres. This was confirmed by cutting the article in various portions and observing the cut portions. The article had a density of 0.45, flexural strength of 5.09 kg/mm$^2$, flexural elastic modulus of 530 kg/mm$^2$, compressive strength in the longitudinal direction of 2.64 kg/mm$^2$, and had an appearance resembling natural wood timber. Further, the article could be easily sawed, planed, and jointed each other by driving nails. Thus, the article could be used for a construction material and was superior to other synthetic wood material.

EXAMPLE 11

Figure 12:
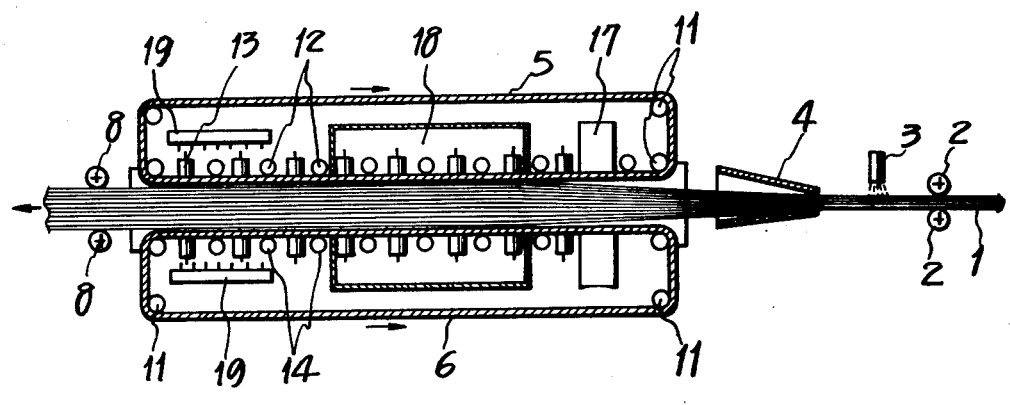
FIG. 12 is a sectional view, taken along the direction of advancement of the continuous fibres, of another specific embodiment in the invention.

In this example was used the apparatus shown in FIG. 12.

Glass fibres used herein were a bundle of continuous glass fibres, which was composed of 150 rovings arranged in parallel relation, wherein each of said rovings was 60 strands, each of said strands being further composed of 200 monofilaments having a diameter of 9 microns. The bundle of glass fibres was arranged in wide spread state. The room temperature was 20° C.

Liquid composition used herein was for use in forming polyurethane. Said liquid composition was composed of two kinds of liquid, A-liquid and B-liquid. A-liquid was prepared by mixing 100 parts of polyether (having hydroxyl group value 400, sold in the name of Hiplox RQ-500, manufactured by Dai Nihon Ink Co.), 1 part of silicon oil (sold in the name of L-5320, manufactured by U.C.C. Co.), 15 parts of trichloromonofluoro-methane (sold in the name of Fleon) and 0.4 part of triethylenediamine. B-liquid was 105 parts of crude 4,4'-diphenylmethane-diisocyanate. As soon as A-liquid was mixed with B-liquid, the resulting liquid composition was emitted from nozzle. The cream time of the liquid composition was 150 seconds at 20° C, the rise time was 210 seconds, and the set time was 420 seconds.

As already stated, the apparatus used herein was shown in FIG. 12. Referring to FIG. 12, bundle of glass fibres 1 was pinched by a pair of rolls 2 and was maintained in wide spread state, then was provided with the liquid composition emitted from nozzle 3, thereafter was passed through gathering means 4, and lastly was passed through a passage for molding, wherein endless belts 5, 6 were rotated by guide rolls 11 and along rolls 12, 14, respectively. In the passage for molding there were provided a cooling box 17, a heating box 18, and water dropping means 19 for cooling the belts. Thereafter, a foamed article was taken out by a pair of rolls 8.

As for the endless belts, upper and lower endless belts had a width of 65 mm, while right and left endless belts had a width of 45 mm, all these endless belts having a thickness of 1.5 mm. and being made of steel. The endless belts were arranged so as to constitute a passage having a cross section of 45 mm × 45 mm. In order to constitute said passage, rolls 12, 14 and the like were arranged in a similar manner as stated in Example 10 in order to outwardly support the endless belts.

Cooling box 17 was made of rubber bags, which contained cooling medium and contacted with the respective endless belts. As the result, the upper, right and left endless belts were maintained at the temperature of 2° C in the respective portions wherein the liquid composition began to foam up, while the lower endless bels was at 6° C. Passage for molding which was enclosed by the endless belts had a total length of 9 m. Heating box 18 had a length of 4.5 m and was situated at almost the middle portion in the passage for molding in the advancing direction. Heating box 18 was heated at the temperature of 120° C. Ahead of the heating box, water dropping means 19 was mounted within the range of 2 m.

The bundle of glass fibres was continuously advanced at the speed of 50 cm/min., and said liquid composition was thereon sprayed at a rate of 330 g/min. At that time, the liquid composition was at the temperature of 20° C, which is just equal to the room temperature. The bundle of glass fibres were then passed through gathering means, wherein the liquid composition was evenly dispersed into the fibres, and thereafter advanced in contact with endless belts 5, 6 and the like. The liquid composition was cooled in the beginning by the endless belts contacting with the cooling box, was heated in the heating box, and thereafter cooled again by water, and formed a square pillar having a section of 45 mm × 45 mm.

The square pillar was cut, and cross sections were observed. Thus, it was found that the pillar was uniformly covered with a low foamed surface portion in a thickness of 4 to 5 mm. The pillar had a specific gravity of 0.45, flexural strength of 639 kg/cm$^2$, flexural elastic modulus of 4.23 × 10$^4$ kg/cm$^2$, and nail-taking-off resistance of 1.08 kg/mm, which was measured by the method described in Japanese Industrial Standard A-5508. Thus, the pillar was especially suited for a construction material.

We claim:

1. An apparatus for continuously manufacturing an elongated shaped article of a foamed resin reinforced by a multiplicity of continuous and parallel fibers, said apparatus comprising:
   a. means for arranging a multiplicity of advancing continuous and parallel fibers into a sheet-like bundle of fibers;
   b. means adjacent and downstream of (a) for impregnating the sheet-like bundle of fibers with a liquid foamable resin;
   c. means adjacent and downstream of (b) for gathering the resultant resin impregnated sheet-like bundle of fibers into a gathered bundle of continuous fibers having said resin dispersed therein;
   d. a movable passage adjacent and downstream of (c) for receiving the gathered bundle of fibers from (c), the walls of which contact and move with the gathered bundle of fibers to form and shape said gathered bundle of fibers into the elongated shaped article, said movable molding passage (i) comprising three or more endless belts facing one another in parallel relationship and (ii) having a cross-section perpendicular to the direction of movement of said bundle of fibers corresponding to the cross-section of the desired shaped article; said movable molding passage further comprising a tube which surrounds and is contiguous to at least a portion of each of the runs of the endless belts which comprise the walls of the movable molding passage for preventing outward deflection of the runs during foaming of the liquid foamable resin, the number of sides of the tube corresponding to the number of endless belts; and e. means adjacent the downstream of (d) for extracting said elongated shaped article from said nolding passage.

2. The apparatus of claim 1 wherein the tube surrounding the walls of the movable molding passage is provided with rolling means on the surfaces that are contiguous with the endless belts to thereby reduce friction between the walls of the tube and the endless belts.

3. The apparatus of claim 1 wherein the endless belts are made of two or more endless belts arranged so as to form a laminate of belts.

4. The apparatus of claim 1 wherein the endless belts are stainless steel endless belts.

5. An apparatus for continuously manufacturing an elongated shaped article of a foamed resin reinforced by a multiplicity of continuous and parallel fibers, said apparatus comprising:
   a. means for arranging a multiplicity of advancing continuous and parallel fibers into a sheet-like bundle of fibers;
   b. means adjacent and downstream of (a) for impregnating the sheet-like bundle of fibers with a liquid foamable resin;
   c. means adjacent and downstream of (b) for gathering the resultant resin impregnated sheet-like bundle of fibers into a gathered bundle of continuous fibers having said resin dispersed therein;
   d. a movable molding passage adjacent and downstream of (c) for receiving the gathered bundle of fibers from (c), the walls of which contact and move with the gathered bundle of fibers to form and shape said gathered bundle of fibers into the elongated shaped article, said movable molding passage (i) comprising three or more endless belts facing one another in parallel relationship and (ii) having a cross-section perpendicular to the direction of movement of said bundle of fibers corresponding to the cross-section of the desired shaped article;
   e. dispersing means situated between said movable molding passage and said means for impregnating the sheet-like bundle of fibers for moving portions of said resin impregnated fibers relative to other portions of said resin impregnated fibers so as to more uniformly disperse the resin among the fibers; and
   f. means adjacent and downstream of (d) for extracting said elongated shaped article from said molding passage.

6. The apparatus of claim 5 wherein said movable molding passage further comprises a series of rollers the axes of which are parallel to each other and perpendicular to the direction of movement of the endless belts, said rollers being arranged along the length of and contiguous to the runs of the endless belts that form the walls of the movable molding passage for preventing outward deflection of the runs during foaming of the liquid foamable resin.

7. The apparatus of claim 6 wherein the endless belts are made of two or more endless belts arranged so as to form a laminate of belts.

8. The apparatus of claim 6 wherein the endless belts are stainless steel endless belts.

9. The apparatus of claim 6 wherein said gathering means is a tube having an inlet side shaped to receive said sheet-like bundle of fibers, an outlet side having dimensions approximating the dimensions of the desired shaped article and walls coverging to said outlet side from said inlet side.

10. The apparatus of claim 6 wherein said dispersing means comprises a plurality of healds which move portions of the said resin impregnated fibres alternately upwardly and downwardly of other portions of said fibres.

11. The apparatus of claim 6 wherein said dispersing means comprises a resilient tube to receive the resin impregnated fibers and means contiguous to the resilient tube for reciprocating the resilient tube.

12. The apparatus of claim 6 wherein said dispersing means comprising crumpling plates.

* * * * *